United States Patent [19]
Bagley

[11] 3,803,951
[45] Apr. 16, 1974

[54] METHOD OF FORMING AN EXTRUSION DIE

[75] Inventor: Rodney D. Bagley, Big Flats, N.Y.

[73] Assignee: Corning Glass Works, Corning, N.Y.

[22] Filed: Oct. 10, 1972

[21] Appl. No.: 295,813

[52] U.S. Cl.......... 76/107 R, 29/157 C, 29/163.5 F, 29/445, 29/455, 29/475, 425/464
[51] Int. Cl............................................. B21k 5/20
[58] Field of Search .......... 29/163.5 F, 455, 157 C, 29/445, 475; 76/107 R, 107 S; 425/464, 466, 96

[56] References Cited
UNITED STATES PATENTS

| 1,849,431 | 3/1932 | Mayhew.............................. 425/466 |
| 2,804,681 | 9/1957 | Brueckner...................... 29/445 UX |
| 2,904,828 | 9/1959 | Smith................................... 425/464 |
| 3,123,900 | 3/1964 | Millar......................... 29/163.5 F X |
| 3,209,622 | 10/1965 | Dietzsch et al..................... 76/107 S |
| 3,406,435 | 10/1968 | Dietzsch............................... 425/96 |
| 3,466,733 | 9/1969 | Pajak et al............................ 29/455 |
| 3,574,581 | 4/1971 | Strickland et al. ............ 76/107 S X |
| 3,599,286 | 8/1971 | Karet................................... 425/464 |

FOREIGN PATENTS OR APPLICATIONS

| 9,228 | 4/1911 | Great Britain.................. 29/163.5 F |
| 248,770 | 2/1948 | Switzerland......................... 425/464 |

Primary Examiner—Charlie T. Moon
Attorney, Agent, or Firm—Burton R. Turner

[57] ABSTRACT

A die for extruding a matrix with essentially circumferential walls is formed by helically winding a slotted and grooved strip of material about a central hub, and bondng or otherwise joining the thus-wound strip material together as an inegral body. The strip material is provided with a longitudinal groove and a plurality of transverse slots communicating with such groove which combine to form discharge outlets for extruding thin-walled, small cell sized matrices.

4 Claims, 4 Drawing Figures

METHOD OF FORMING AN EXTRUSION DIE

BACKGROUND OF THE INVENTION

This invention pertains to the art of manufacturing thin-walled honeycomb structures from extrudable material such as ceramic batches and thermoplastic materials which have the property of being able to flow or plastically deform during extrusion while being able to become sufficiently rigid immediately thereafter so as to maintain structural integrity. More specifically, the present invention relates to an improved extrusion die structure for extruding a matrix with essentially circumferential walls, and to a method for forming such die structure from pre-formed strip material.

In the past ceramic matrices having essentially circumferential walls, such as are utilized for heat exchangers and the like, have been made by spirally wrapping alternate thin crimped and flat sheets of carrier material containing a ceramic powder and then firing the structure into a monolithic ceramic body, such as disclosed in U. S. Pat. No. 3,112,184. Although suitable heat exchange bodies having a matrix with essentially circumferential walls can be produced through the utilization of this known method, it has not been completely satisfactory since the process not only requires substantial production facilities and close process control, but also the process is relatively slow and requires costly materials.

Further, known die structures for extruding honeycomb material are not presently adaptable to form extruded matrices having essentially circumferential walls, due to the inherent complexity of forming such structures. A typical die assembly is shown in U. S. Pat. No. 1,849,431 wherein a spider or cross-head positions a plurality of rods, one for each core or cell in the article to be formed. In addition, U. S. Pat. No. 3,406,435 discloses apparatus for manufacturing ceramic elements having a honeycomb structure wherein a plurality of elongated thin-walled sleeve members having extensions with closed-ended portions are connected to an extruder cylinder. The material to be extruded is forced through the elongated sleeve members and outwardly through orifices formed in side walls of the extensions attached thereto. The sleeve extensions are spaced from one another to provide channels in which the material from the orifices becomes reshaped into a honeycomb structure; however, it would be practically impossible to form such structures with circumferential walls.

Accordingly, the present invention has overcome the problem of extruding a matrix with essentially circumferential walls by providing a completely unique manner of forming an extrusion die with uniform discharge slots which are not only circumferentially oriented but which are maintained in substantially rigid orientation during extrusion.

SUMMARY OF THE INVENTION

In its very simplest form, the present invention is directed to an improved extrusion die structure for forming thin-walled cellular or honeycomb structures having essentially circumferential walls, and to a method of forming such die structures. The extrusion die is preferably formed from a continuous length of pre-formed strip material having a longitudinal groove, a plurality of transverse slots communicating with the longitudinal groove, and recessed channel portions. The thus-formed strip material is helically wound upon itself in such a manner so that the longitudinal groove and transverse slots cooperate with one another to provide a plurality of interconnected discharge openings of uniform thickness in an outlet face of the die formed by the helical windings.

The helically wound longitudinal groove, formed in one surface of the strip material, cooperates with a planar back surface of an adjacent portion of such strip material to provide essentially circumferential openings, whereas the transverse slots communicate between adjacent circumferential openings and thereby provide a plurality of intermittent substantially radial openings between the essentially circumferential openings formed by the groove. The recess channels communicate with an inlet face of the die structure and form feed channels for providing extrudable material to a curved or arcuate gridwork of inter-connected discharge openings or slots formed in the outlet face of the die.

The circumferential discharge slots as well as the radial discharge slots are of a predetermined size so as to form a desired thin-walled structure, and the radial slots may either be randomly oriented dependent upon the spiral configuration or they may be programmed so as to be equally spaced apart in adjacent tiers. The discharge slots extend inwardly from the outlet face a distance sufficient to insure the lateral filling of all outlet portions of such slots with the extrudable material delivered thereto by the feed channels prior to such material being discharged from the die. In order to facilitate such lateral flow of batch material within the discharge slots, so as to provide a coherent mass of such material within the gridwork formed by the interconnected discharge slots, the slots are preferably formed with a greater resistance to batch flow than that provided by the feed channels. Further, to enhance the lateral filling of the discharge openings, the exit end of the feed channels may be curved or contoured thereby providing smoother flow and easier filling of the slots.

Although it is conceivable that the strip material could be wound upon itself in a helical fashion from a central starting point to the outer desired circumference, when making dies for extruding heat exchanger matrices, it is preferred to initially wind the strip material about a central core or hub and then upon itself to the desired outer circumference. In either case, the helically-wound die is then fused or otherwise joined together as an integral structure to impart the required strength and rigidity necessary to prevent shearing between the adjacent layers when under extrusion pressure.

It thus has been an object of the present invention to provide a novel relatively easily manufacturable extrusion die structure for forming thin-walled honeycomb articles having essentially circumferential walls with radially extending partitions therebetween, wherein said die structure is substantially rigid so as to maintain dimensional stability during extrusion.

A further object of the invention has been to provide an improved method of forming a die structure for extruding a matrix with essentially circumferential walls, by helically winding a continuous preformed strip of material upon itself and bonding such helically wound structure together into a rigid unitary extrusion die.

DESCRIPTION OF THE PREFERRED EMBODIMENTS

Figure 1:
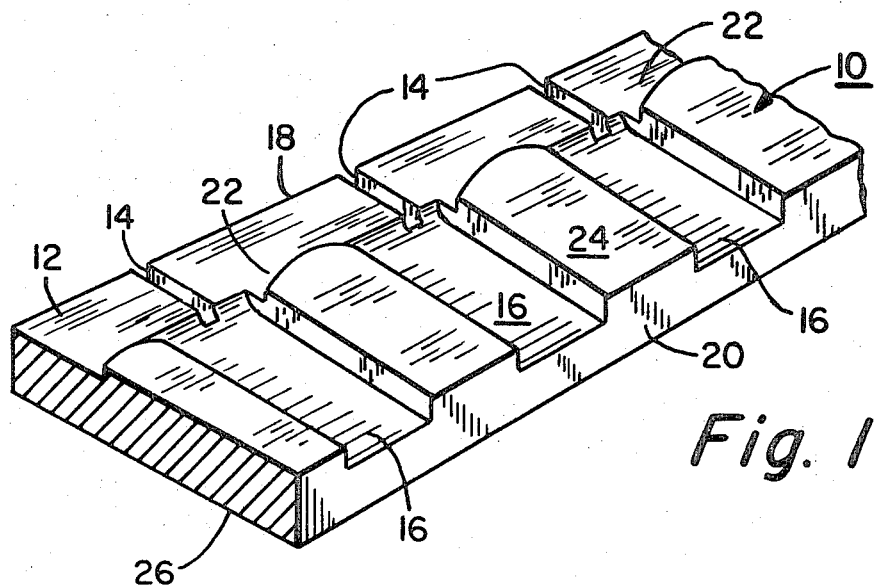
FIG. 1 is a fragmental perspective view of one embodiment of preformed strip material which may be utilized to from the novel die of the present invention.

Referring now to the drawings, and particularly FIG. 1, a section of preformed strip material 10 is shown being provided with a longitudinal groove 12, a plurality of transverse slots 14, and a plurality of recessed channels 16. The longitudinal groove 12 and transverse slots 14 communicate with a front edge 18 of the strip 10, whereas the recessed channels 16 communicate with the back edge 20 of such strip. The exit end 22 of recessed channels 16, which communicate with longitudinal groove 12 and transverse slots 14, are shown as being rounded or contoured so as to facilitate the complete filling of the longitudinal groove with extrudable material. It will be noted that the groove 12 and channels 16 are formed in the strip body 10 so as to communicate with an upper surface 24, which surface provides partitions between channels 16, whereas transverse slots 14 not only communicate with upper surface 24, but also a substantially uninterrupted continuous bottom surface 26. The slots 14 may, if desired, extend diagonally with respect to surfaces 24 and 26 in either parallel or converging-diverging arrangements.

Figure 3:
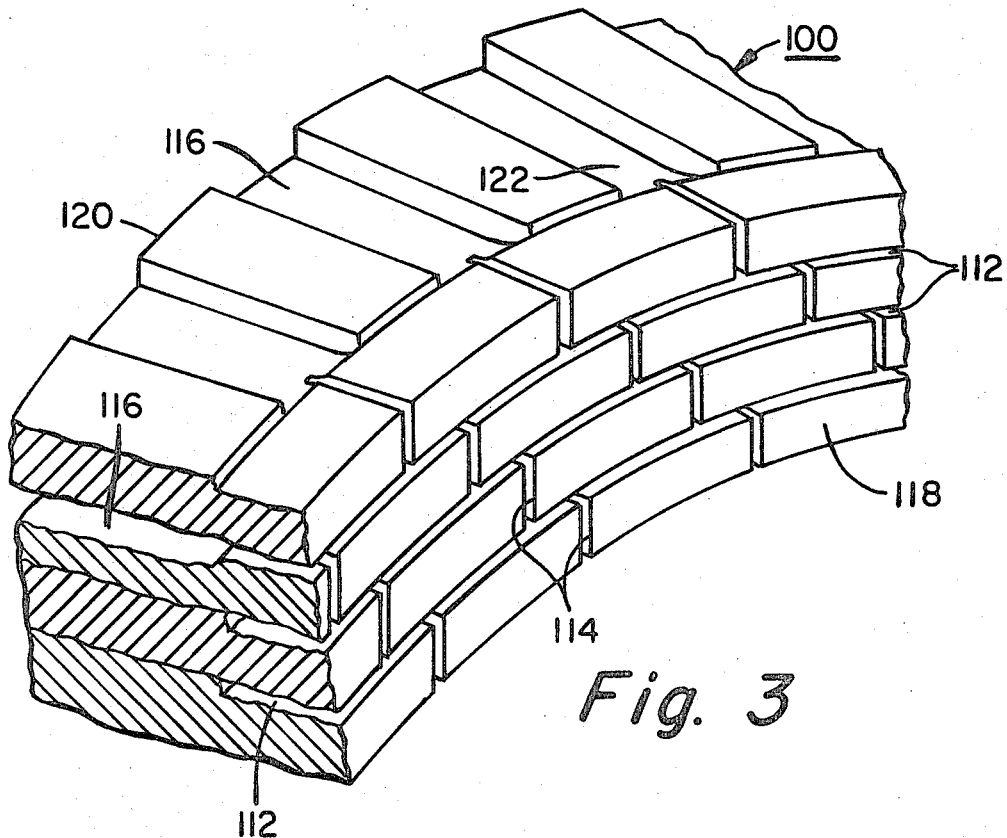
FIG. 3 is an enlarged fragmental perspective view, partially in section, taken along line 3—3 of the die face shown in FIG. 2.
Figure 2:
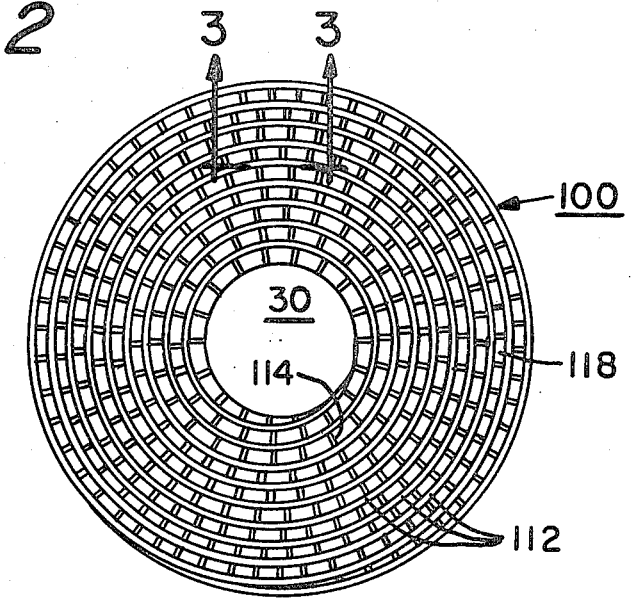
FIG. 2 is a plan view of the outlet face of a die embodying the present invention.
Figure 4:
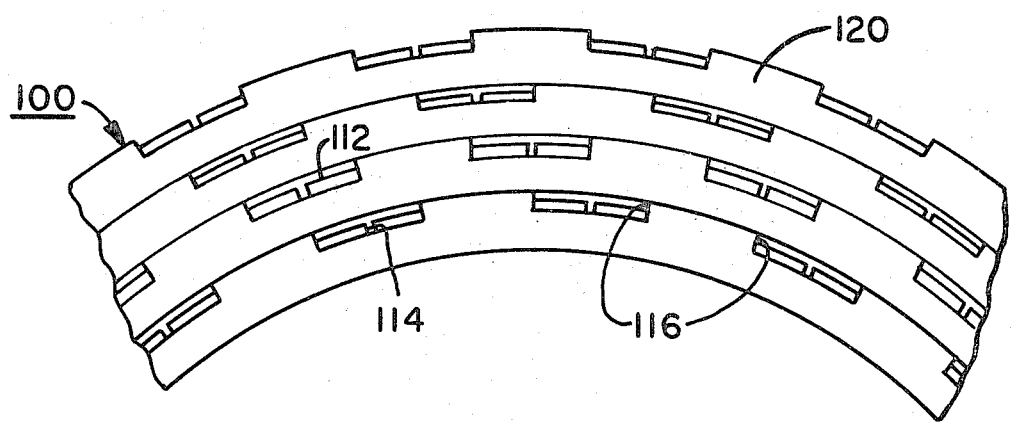
FIG. 4 is an enlarged fragmental plan view of the inlet face of the die shown in FIG. 2.

Referring now to FIGS. 2, 3 and 4, a length of preformed strip material 10 is shown helically wound upon itself about a hub or core 30 to produce an extrusion die 100 for forming matrices with essentially circumferential walls. That is, the thus-formed die has a spirally formed discharge outlet 112 having an appearance of a plurality of concentric spaced apart circular openings which are connected together by a plurality of discontinuous radially-extending discharge slots 114. As shown in FIGS. 2 and 3, the discharge slots 112 and 114 communicate with the outlet face 118 of the die 100. A plurality of feed channels 116 communicate between an inlet face 120 of the die 100 and the curved gridwork of discharge slots 112, 114. As shown in FIG. 3, the exit end 122 of the feed channels 116 has not been provided with a curved or rounded feed path in the manner disclosed in FIG. 1.

It will be apparent that the discharge outlets 112 are formed by the spacing provided by longitudinal groove 12 with respect to an adjacent bottom surface 26 of the wound strip material 10. In a like manner, the feed channels 116 are formed by the spacing provided by recess channels 16 and the adjacent bottom surface 26 of the strip wound material 10. Since the longitudinal groove 12, transverse slots 14 and recess channels 16 are preformed in strip material 10 with desired dimensions, the resulting discharge slots 112, 114 and feed channels 116 may be provided with controlled tolerances.

Although I prefer to form the die of the present invention from a single length of preformed strip material which is helically wound about a hub, due to the ease of such manufacture, if desired such strip material could be cut into lengths and the concentric circular layers of such strip material could be laid up about a hub, with the cut ends of each such layer being in abutment. In either case, the thus-formed die structure is joined together by any suitable means such as interlocking grooves, brazing, welding, fusing, etc. so as to form a rigid unitary structure which will withstand the high pressures of extrusion. Although I prefer to form the die from machined strip steel and weld the unit into an integral structure, the strip material could also include other suitable metals and ceramic materials. For instance, a ceramic die could be made of aluminum by wrapping a pre-slotted tape of the type used for preparing substrates by the doctor-blade technique, wherein the tape with a ceramic suspended in an organic binder is wrapped upon a central cord and fired into an integral monolithic unit. Further, for abrasive extrusions, tungsten carbide could be cast into a ribbon, slotted, wrapped, and then fired into a monolithic structure having high strength and good abrasion resistance.

As a specific example, steel strip material could be machined with a longitudinal groove formed in a top surface along a front edge having a depth from the top surface of 0.007 inches and a width from the front edge of 0.1 inches. A plurality of saw cuts having a thickness of 0.007 inches could be formed every 0.031 of an inch along the front edge, and a plurality of recessed channels, also formed in the top surface, having a depth of 0.021 inches and a width of 0.020 inches would extend from the inner edge of each saw cut to the back edge of the strip. The strip material would then be helically wound upon a hub of about 3 inches diameter so as to form a die having a diameter of about 12 inches which may then subsequently be welded into a unitary structure. A cylindrical sheath may be placed about the outer periphery of the thus-formed structure to not only esthetically finish-off the die but also for added strength.

The novel die of the present invention is utilized in accordance with known extrusion practices, with extrudable material being forced into the feed channels 116 and outwardly through the arcuate gridwork of discharge slots 112, 114 to produce a honeycomb structure having a matrix with essentially circumferential walls, which walls provide rails for gliding seals when the structure is used as a heat exchanger. Although I have disclosed the now preferred embodiments of my invention, it will be apparent to those skilled in the art that various changes and modifications may be made thereto without departing from the spirit and scope thereof as defined in the appended claims.

I claim:

1. A method of forming an extrusion die for extruding a honeycomb matrix with essentially circumferential walls which comprises, forming a longitudinal groove along one edge of a predetermined length of strip material, forming a plurality of longitudinally spaced-apart slots in said one edge in communication with said groove, forming a plurality of longitudinally spaced-apart recessed channels within said strip material which communicate between said groove and an edge opposite said one edge, winding said formed strip material upon itself to form a substantially cylindrical die having a curved grid-work of interconnected discharge slots formed by said groove and said spaced-apart slots communicating with one surface thereof, and a plurality of feed channels communicating with an opposite surface thereof for feeding material to said discharge slots, and bonding said strip material together so as to form an integral structure.

2. A method of forming a die as defined in claim 1 including the step of helically winding said strip material upon itself so that an adjacent bottom surface of said strip material cooperates with said groove and said recessed channels to form a helically-wound substantially circumferential outlet slot and a plurality of feed channels therefore, respectively.

3. A method of forming an extrusion die as defined in claim 1 including the step of winding said strip material upon a hub of predetermined diameter.

4. A method of manufacturing a die as defined in claim 3 wherein a plurality of lengths of said strip material are concentrically wound upon each other about said hub.

* * * * *